United States Patent
Miyamaru et al.

(10) Patent No.: US 8,042,873 B2
(45) Date of Patent: Oct. 25, 2011

(54) DRIVER'S SEAT OF WORK VEHICLE

(75) Inventors: Noriyuki Miyamaru, Sakai (JP); Junta Kuwae, Sakai (JP); Tatsuyuki Kashimoto, Sakai (JP); Takayoshi Otsuka, Okegawa (JP)

(73) Assignee: Kubota Corporation, Osaka (JP)

( * ) Notice: Subject to any disclaimer, the term of this patent is extended or adjusted under 35 U.S.C. 154(b) by 220 days.

(21) Appl. No.: 12/402,185

(22) Filed: Mar. 11, 2009

(65) Prior Publication Data

US 2010/0001571 A1 Jan. 7, 2010

(30) Foreign Application Priority Data

Jul. 4, 2008 (JP) ................................. 2008-175977
Jul. 4, 2008 (JP) ................................. 2008-175978

(51) Int. Cl.
*A47C 7/02* (2006.01)
(52) U.S. Cl. ......... 297/452.21; 297/452.23; 297/452.25; 297/452.46
(58) Field of Classification Search .......... 297/452.21–452.26, 452.42–452.47, 297/180.1

See application file for complete search history.

(56) References Cited

U.S. PATENT DOCUMENTS

| | | | | |
|---|---|---|---|---|
| 3,482,874 A | * | 12/1969 | Henebry et al. | 297/445.1 |
| 3,485,698 A | * | 12/1969 | Marsh | 156/267 |
| 3,630,570 A | * | 12/1971 | Swenson | 297/452.46 |
| 3,770,318 A | * | 11/1973 | Fenton | 297/452.47 |
| 4,084,775 A | * | 4/1978 | Pelly | 297/452.42 |
| 4,522,446 A | * | 6/1985 | Sheridan | 297/377 |
| 4,717,202 A | * | 1/1988 | Batchelder et al. | 297/188.04 |
| 4,953,913 A | * | 9/1990 | Graebe | 297/452.25 |
| 5,211,697 A | * | 5/1993 | Kienlein et al. | 297/452.42 |
| 5,342,110 A | * | 8/1994 | Merrick | 297/232 |
| D418,326 S | * | 1/2000 | Sexton et al. | D6/381 |
| 6,893,087 B2 | * | 5/2005 | Hancock et al. | 297/219.11 |
| 2008/0099264 A1 | | 5/2008 | Oka et al. | |

FOREIGN PATENT DOCUMENTS

| | | |
|---|---|---|
| JP | 09123806 | 5/1997 |
| JP | 10138839 | 5/1998 |
| JP | 2004142559 | 5/2004 |
| JP | 2006096320 | 4/2006 |

* cited by examiner

*Primary Examiner* — Laurie Cranmer
(74) *Attorney, Agent, or Firm* — The Webb Law Firm

(57) ABSTRACT

A driver's seat of a work vehicle comprising a seatback section, and a seating section including a receiving surface portion formed in an intermediate portion of the seating section for receiving buttocks of the operator, and a recessed groove formed along a side frame portion at a boundary between the side frame portion and the receiving surface portion to open at an extension distal end of the seating section. The recessed groove has a bottom surface inclined downwardly from a back end of the seatback section to the extension distal end of the seating section.

5 Claims, 9 Drawing Sheets

DRIVER'S SEAT OF WORK VEHICLE

TECHNICAL FIELD

The present invention relates to a driver's seat of a work vehicle comprising a seatback section and a seating section.

BACKGROUND ART

One conventional example of a driver's seat of an agricultural and construction work vehicle is disclosed in Japanese Unexamined Patent Application Publication No. 2004-142559 (referred to as JP 2004-142559 hereinafter) which includes a drain hole (element 27b) for avoiding accumulation of rain water in a seating section of the driver's seat in outside work (see paragraph 0028 of the publication; FIGS. 2 to 4).

Another example is disclosed in Japanese Unexamined Patent Application Publication No. 9-123806 (referred to as JP 9-123806 hereinafter) which includes a seating section having a pair of right and left longitudinal guide grooves (element 32), and a transverse guide groove (element 31) communicating with the longitudinal guide grooves in a central portion of the seating section. The longitudinal guide grooves have rear ends communicating with guide grooves formed in a seatback section to form drain holes (element 36) in a boundary between the seatback section and the seating section (see paragraph 0015 of the publication; FIGS. 1 to 4).

SUMMARY OF THE INVENTION

Problem to be Solved by the Invention

The arrangement of JP 2004-142559 requires that eyelet metal is attached to an edge of the drain bore. Such a metal portion weakens the sense of seating, and an additional operation for attaching the metal is necessary, which needs improving as a drainage structure.

On the other hand, in the arrangement of JP 9-123806, the drain bores are formed in the boundary between the seatback section and the seating section, which can prevent the eyelet metal from contacting the buttocks of the operator. However, it is difficult to form the drain hole per se, which still leaves room for improvement.

The object of the present invention is to provide a driver's seat of a work vehicle capable of preventing rain water from being accumulated in a driver's section even in outside work.

Means for Solving the Problem

A characteristic feature of a driver's seat of a work vehicle of the present invention lies in comprising a seatback section, and a seating section including a receiving surface portion formed in an intermediate portion of the seating section for receiving buttocks of the operator, and a recessed groove formed along a side frame portion at a boundary between the side frame portion and the receiving surface portion to open at an extension distal end of the seating section, wherein the recessed groove has a bottom surface inclined downwardly from a back end of the seatback section to the extension distal end of the seating section.

With the above-noted arrangement, the side frame portion is formed to improve retainability of the buttocks and easily secure the stability of the driver's posture in turning the vehicle in a ridge side.

Also, the recessed groove is formed to easily drain rain water. In addition, the recessed groove is open at the extension distal end of the seating section, which eliminates any edging treatment using the eyelet metal required in forming a drain hole. As a result, the sense of seating is not weakened.

Further, the recessed groove is formed along the side frame portion and positioned at a side end of the receiving surface portion, which less often acts on the buttocks or hams of the operator directly. The sense of seating is not weakened in this aspect.

Since the recessed groove has the bottom surface inclined downwardly from the back end of the seatback section to the extension distal end of the seating section, rain water is smoothly drained to restrain rain water from being accumulated.

It is preferable that the receiving surface portion has a convex surface having a downward inclined surface toward the recessed groove.

With this arrangement, since the receiving surface portion has the convex surface, both the hams are easily retained between the side frame portions, and rain water entering the receiving surface portion is allowed to flow into the recessed groove, which prevents rain water from being accumulated in the receiving surface portion.

It is also preferable that the side frame portion has an upper end higher than an upper end of the receiving surface portion.

With this arrangement, since the upper end of the side frame portion is higher than the upper end of the receiving surface portion, both the hams of the operator are reliably retained when seated.

It is further preferable that the receiving surface portion has downward inclination from the distal end of the seating section toward the seatback section.

With this arrangement, since the receiving surface portion has downward inclination from the distal end of the seating section toward the seatback section, the operator can be seated deeply to increase comfortableness when seated.

DESCRIPTION OF THE PREFERRED EMBODIMENT

First Embodiment

Figure 1:
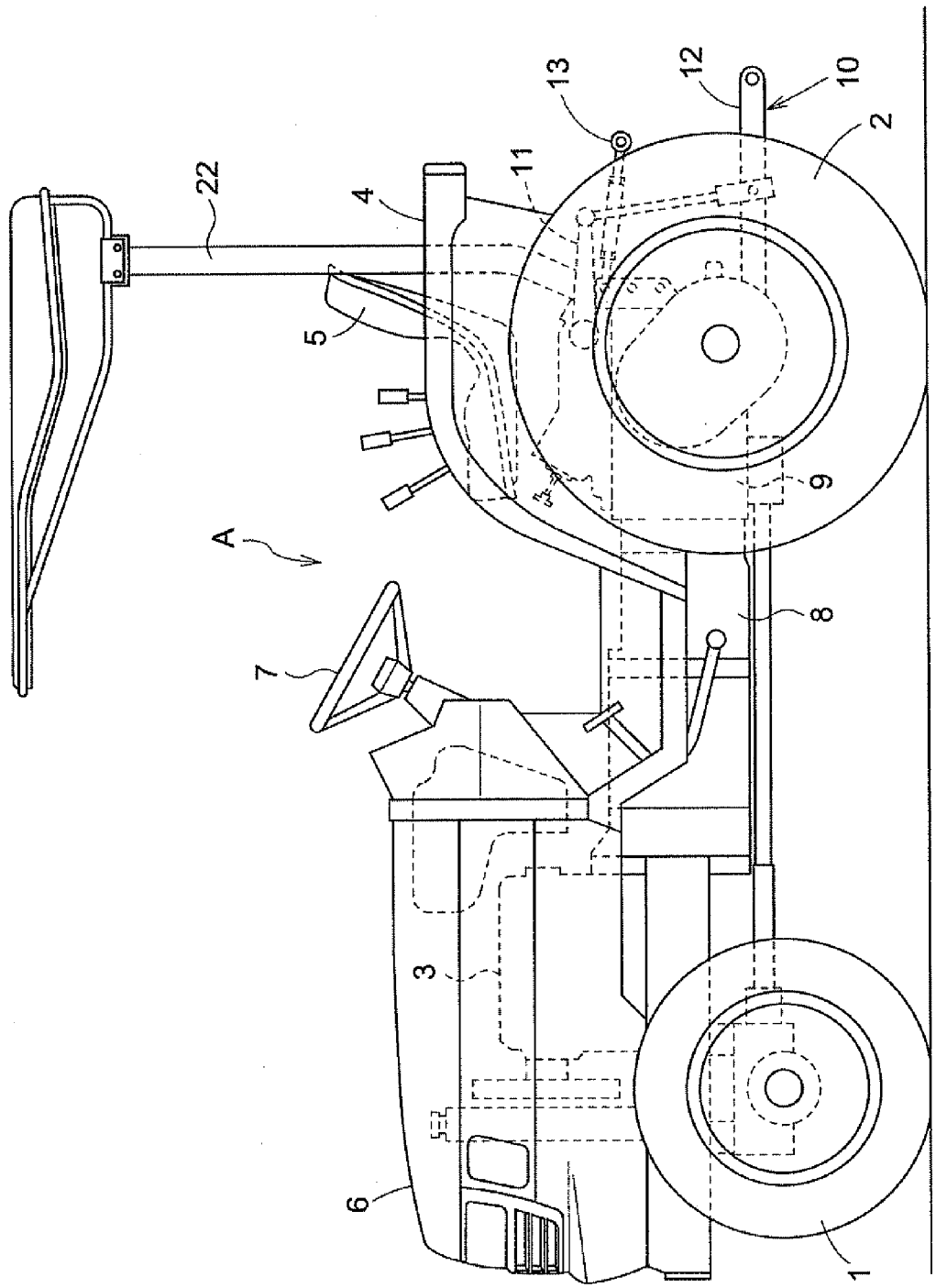
FIG. 1 is a side elevation of an agricultural tractor.

A construction of an agricultural tractor A including a rotary tiller (not shown) that is one example of a ground work machine will be described hereinafter. FIG. 1 shows the agricultural tractor A comprising a vehicle body 8 including front and rear wheels 1 and 2, an engine 3 and an engine hood 6 for covering the engine 3 provided forwardly of the vehicle body 8, a steering wheel 7 provided rearwardly of the engine hood 6, rear wheel fenders 4 acting as a right and left fenders provided rearwardly of the vehicle body 8, a driver's seat 5 provided between the right and left rear wheel fenders 4, and a transmission case 9 provided under the driver's seat 5.

A lift apparatus 10 of a three-point link type is formed by a pair of right and left lift arms 11 supported to an upper end portion of the transmission case 9, a pair of right and left lower links 12 provided under the lift arms 11, and a single upper link 13 provided above the lower links 12. The rotary tiller is connected to the lift apparatus 10 to form a work vehicle.

Figure 4:
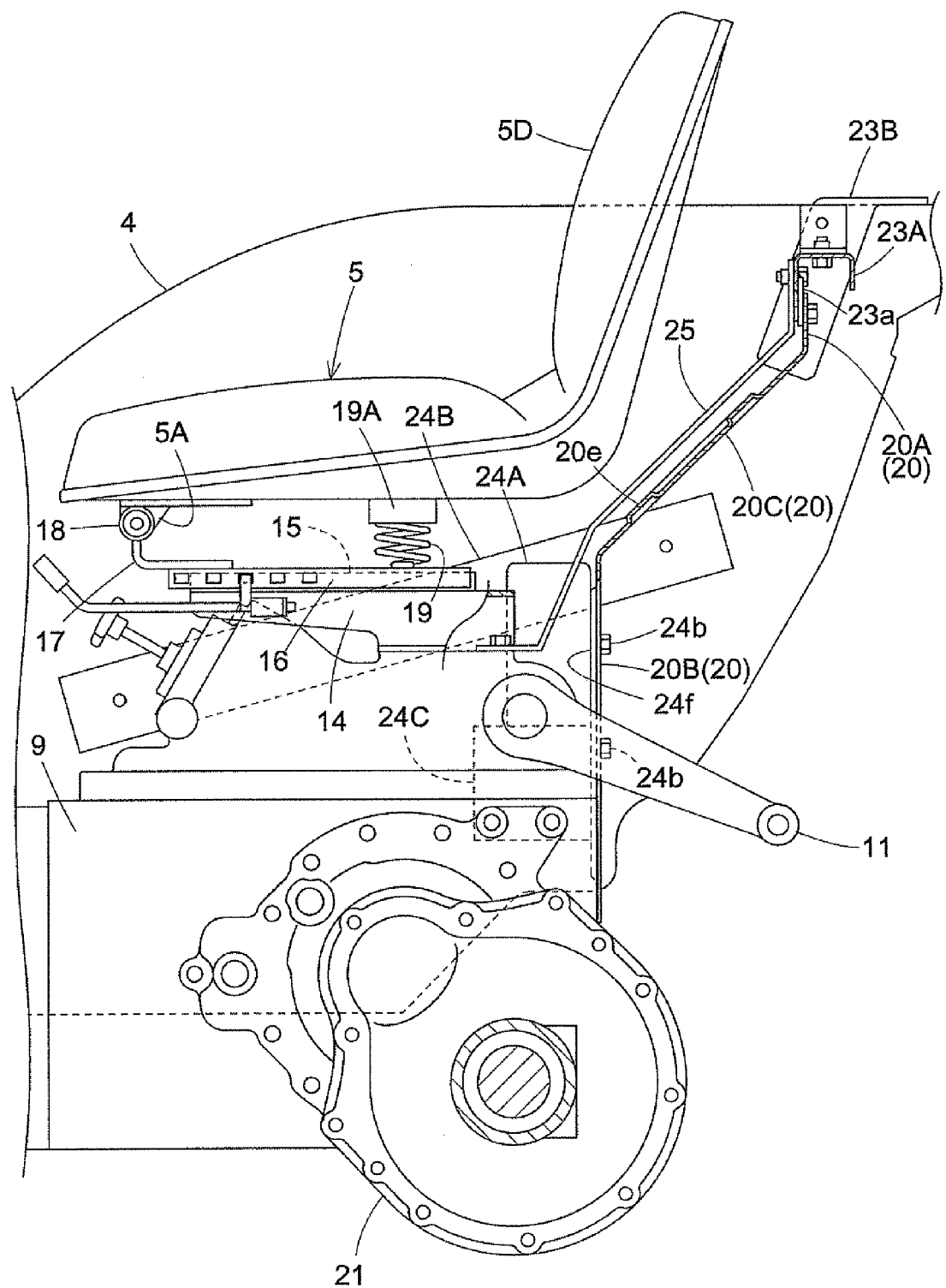
FIG. 4 is a side view showing the rear cover member and the driver's seat.

An attaching structure for the driver's seat 5 will be described next. As shown in FIG. 4, a slide guide member 15 is fixed to a support frame 14 placed on the transmission case 9. A slide member 16 is provided to be guided by the slide guide 15 and slidably movable. A receiving arm 17 extends forwardly of the vehicle body from a distal end of the slide member 16, and a cylindrical support boss 18 extending transversely is fixed to a distal end of the receiving arm 17.

On the other hand, a bracket 5A is mounted at a bottom surface of the driver's seat 5. The driver's seat 5 is attached to the slide member 16 by connecting the bracket 5A to the support boss 18 through a connecting pin (not shown). The driver's seat 5 is vertically pivotable about an axis of the support boss 18. An urging spring 19 is provided at the bottom surface of the driver's seat 5 rearwardly of the bracket 5A to be positioned on a top surface of the slide member 16. A dish-like receiving member 19A is placed on an upper end of the urging spring 19 to support the driver's seat 5.

With the arrangement noted above, the driver's seat 5 is slidable with the slide member 16 thereby adjusting the position of the driver's seat 5.

Figure 6:
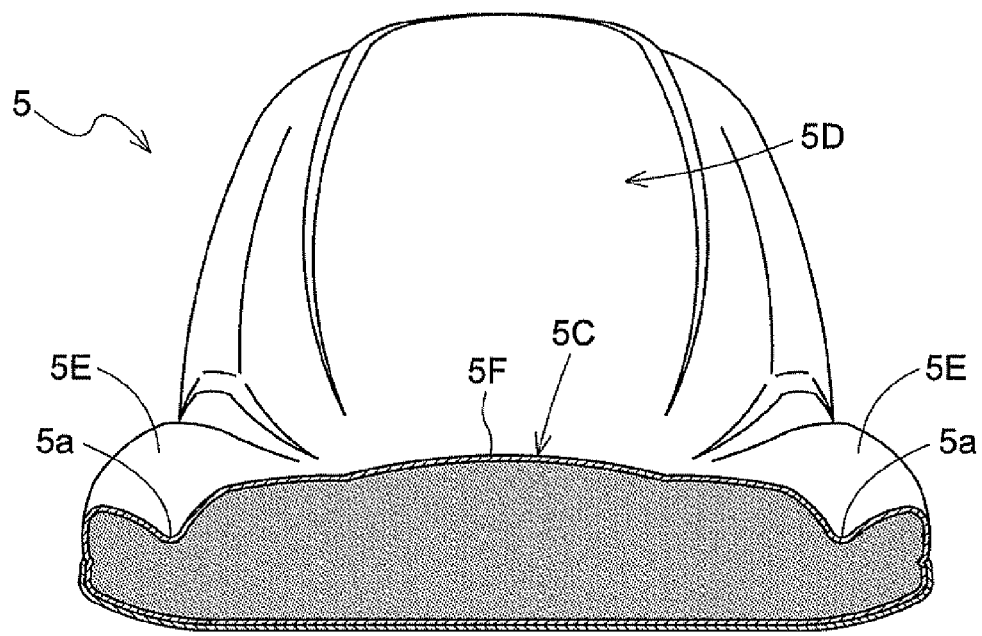
FIG. 6 is a front view of the driver's seat in vertical section.
Figure 7:
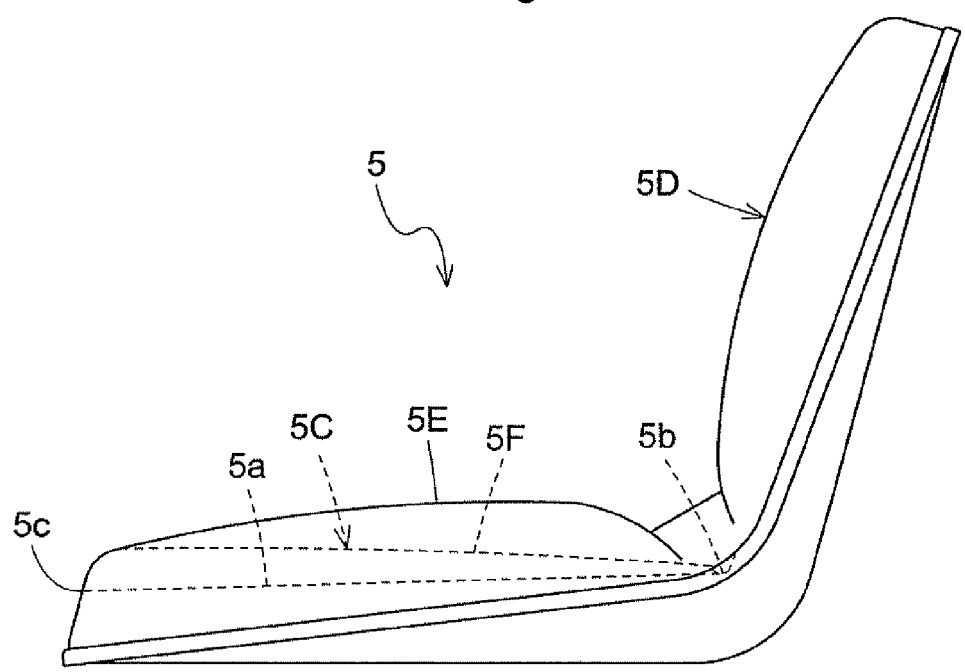
FIG. 7 is a side view of the driver's seat.
Figure 8:
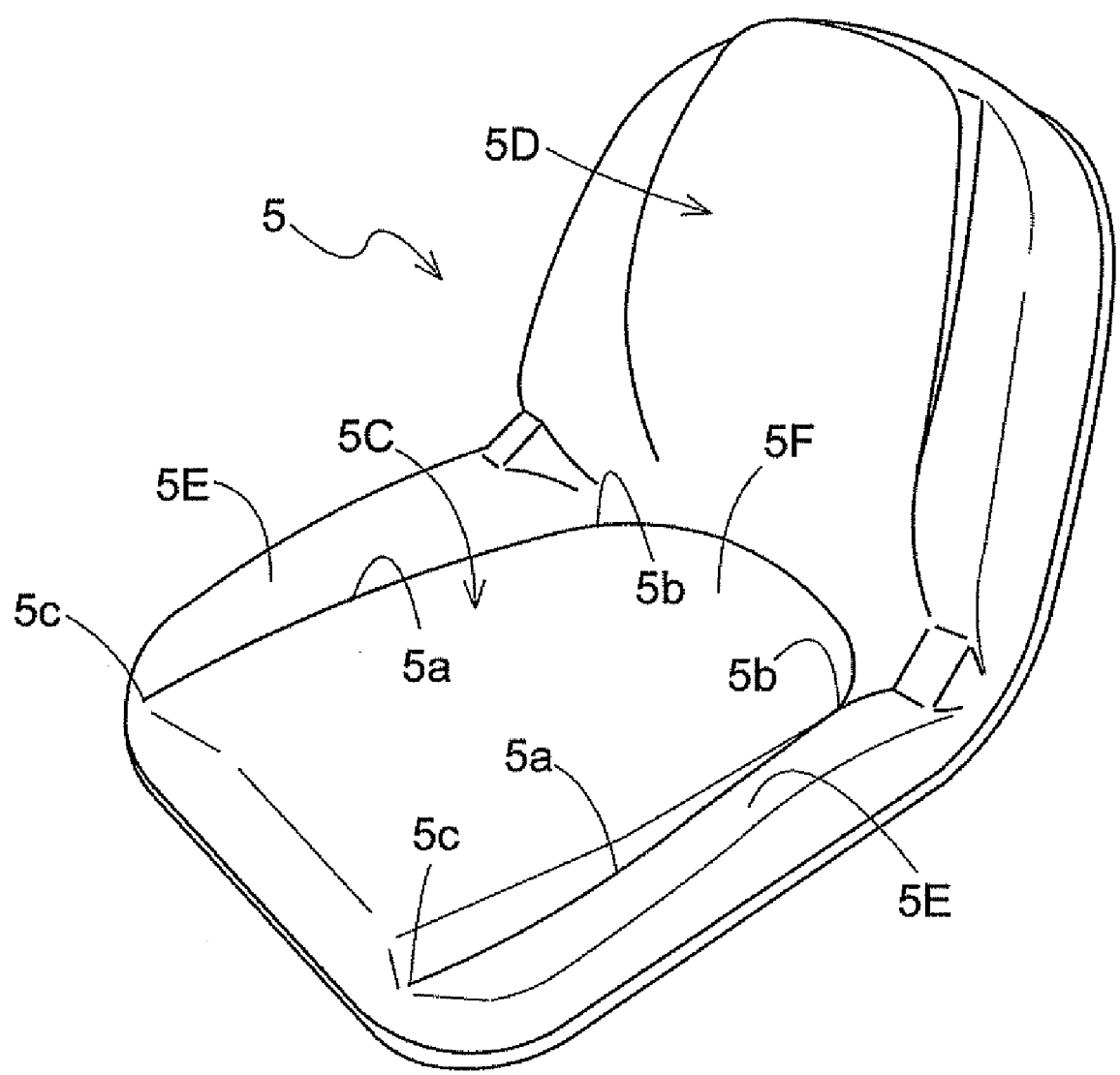
FIG. 8 is a perspective view of the driver's seat.

Next, an arrangement of a seating section 5C of the driver's seat 5 will be described. As shown in FIGS. 6 to 8, the driver's seat 5 includes the seating section 5C supported by the slide member 16, and a seatback section 5D extending from and integrally formed with the seating section 5C. The seating section 5C is provided with a right and left bulk side frame portions 5E, and a receiving surface portion 5F positioned between the right and left side frame portions 5E and bulging upward gradually toward a center thereof to define a mountain-shape. A pair of right and left drain grooves 5a formed as recessed grooves that are concaved in a V-shape are provided between the side frame portions 5E and the receiving surface portion 5F.

Each drain groove 5a is gradually inclined downward from a back end 5b positioned near a proximal portion of the seatback section 5D toward an extension distal end 5c positioned at a forward end of the seating section 5C to achieve good drainage. The downward inclination will suffice if such inclination is maintained when the vehicle body 8 is at least in a horizontal position.

It is preferable that an upper end of the side frame portion 5E is higher than an upper end of the receiving surface portion 5F. Also, it is preferable that the receiving surface portion 5F has downward inclination from the distal end of the seating section 5C toward the seatback section 5D.

Figure 2:
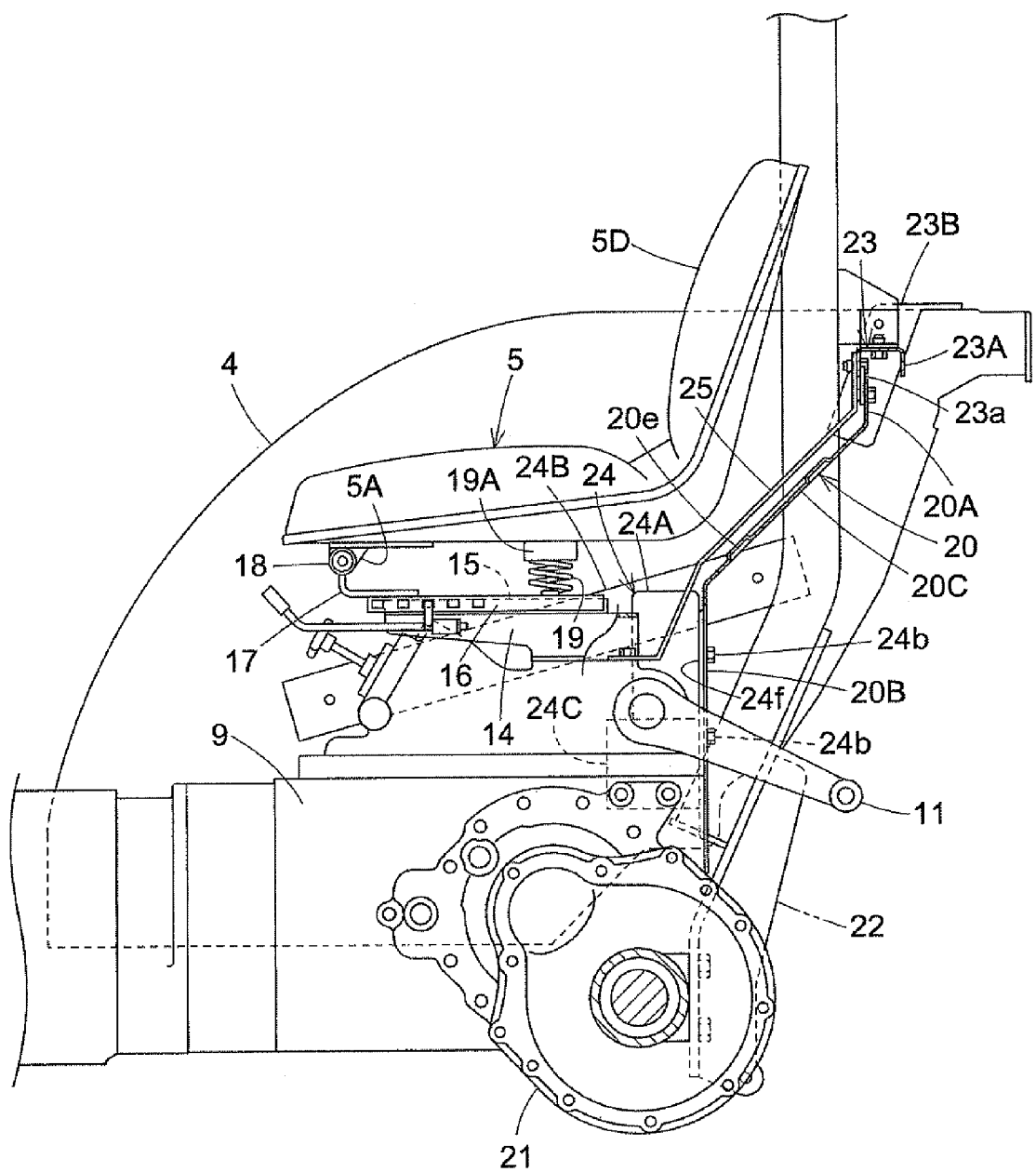
FIG. 2 is a side view showing a state in which a rear cover member and a driver's seat are attached.
Figure 3:
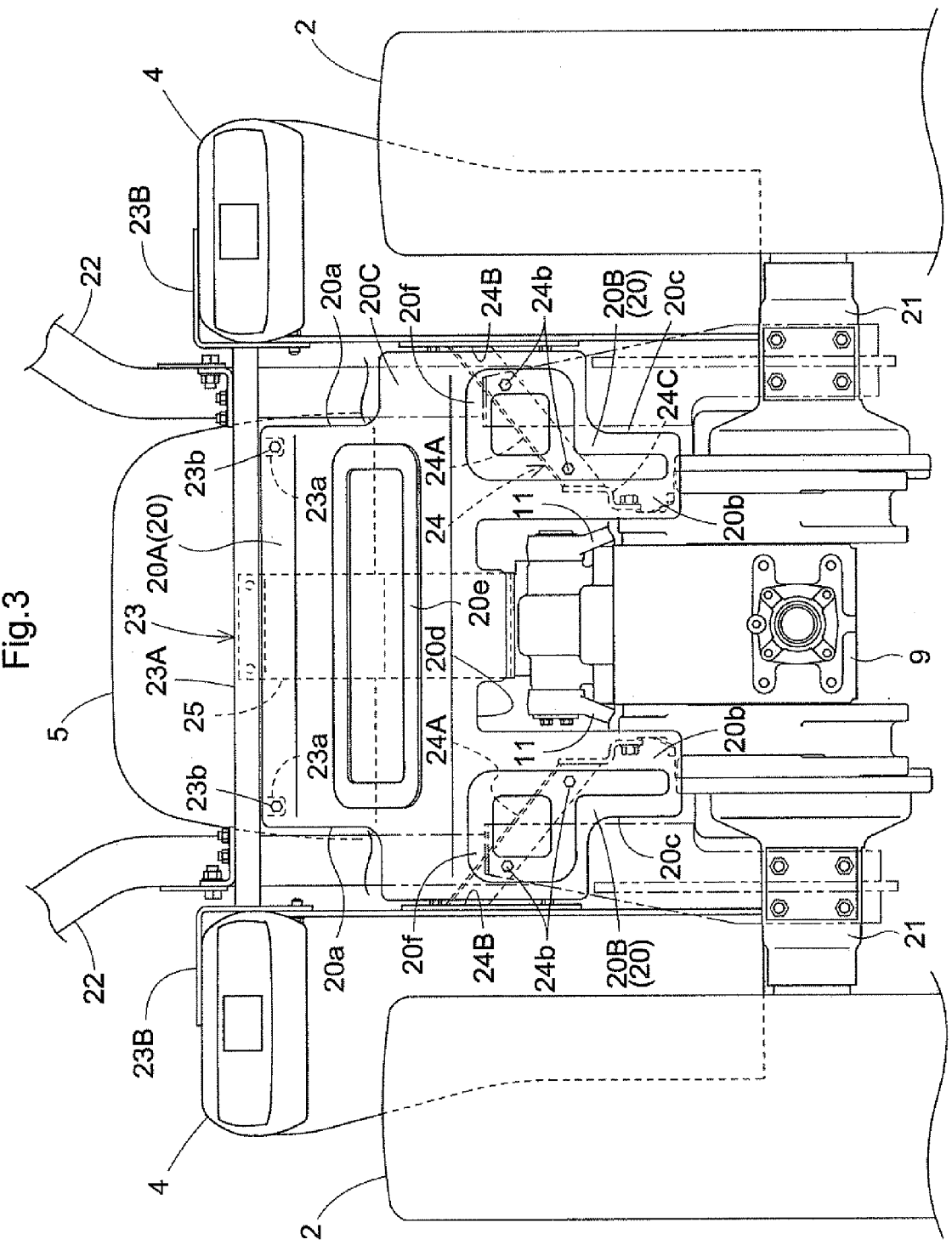
FIG. 3 is a rear view showing a state in which the rear cover member is attached.
Figure 9:
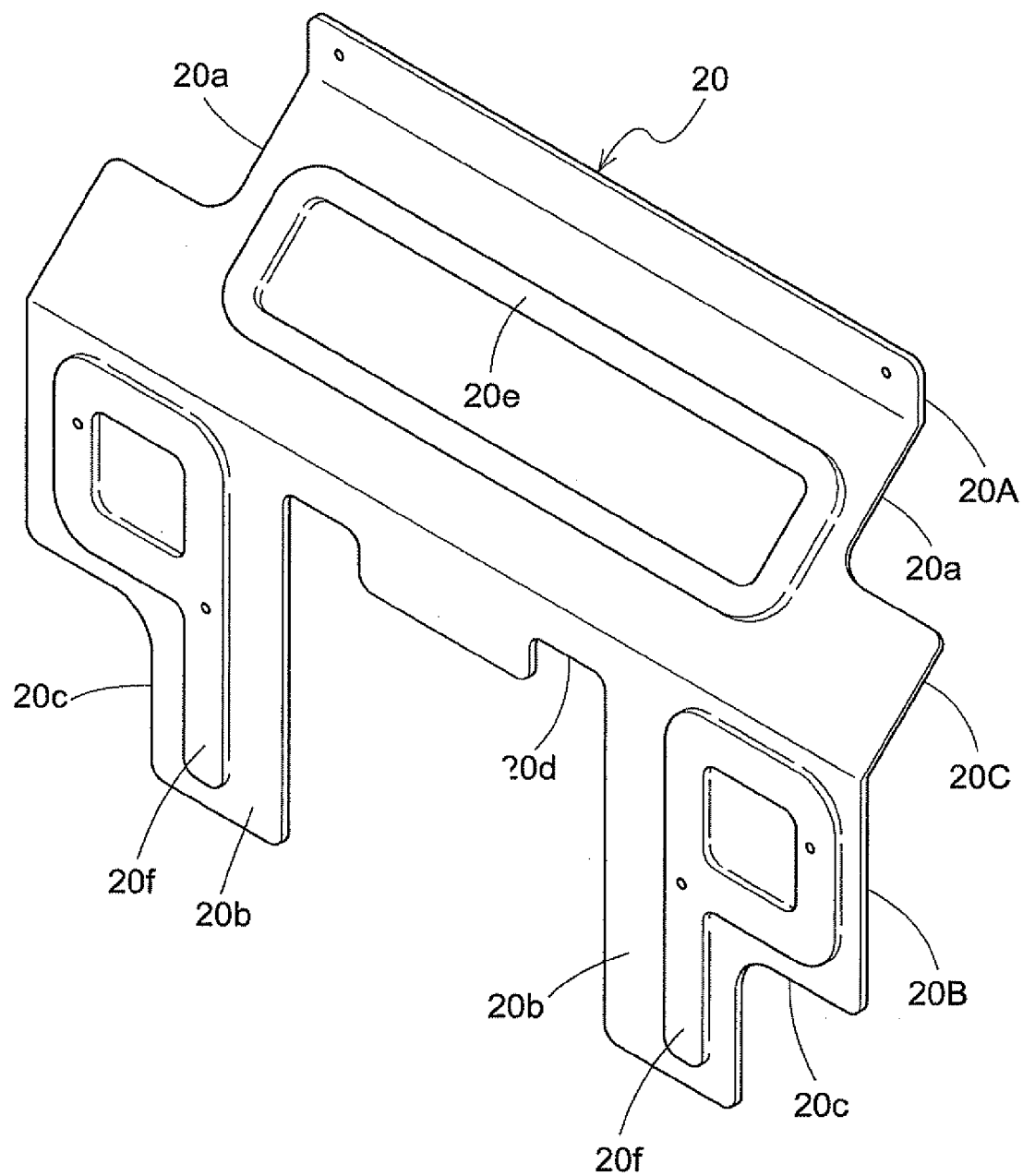
FIG. 9 is a perspective view of the rear cover member.

A rear cover member 30 will be described. As shown in FIGS. 2, 3, and 9, the rear cover member 30 has an upper cover member 20A extending vertically and positioned at a rear side of the seatback section 5D of the driver's seat 5, a lower cover member 20B extending vertically and positioned more forwardly of the vehicle body 8 than the upper cover member 20A at lateral opposite sides of a range of vertical movement of the lift arms 11, and an intermediate cover member 20C extending obliquely for connecting the upper cover member 20A to the lower cover member 20B, thereby defining a crank-like shape as viewed from a side.

As shown in FIG. 3, the lower cover member 20B has large recessed portions 20d formed in a central portion thereof to avoid collision with the lift arms 11 pivotably supported to the upper end of the transmission case 9 when they are vertically and pivotably moved. A pair of right and left divisional sections 20b are formed to surround the recessed portions 20d. The upper cover member 20A and the divisional sections 20b of the lower cover member 20B have cutaway portions 20a and 20c, respectively, at lateral end portions thereof thereby avoiding collision with a ROPS 22 provided to be raised from a rear axle case 21 as shown in FIG. 2.

An attaching structure for the rear cover member 20 will be described. As shown in FIGS. 2 and 3, an upper connecting frame 23 extends between upper ends of the right and left rear wheel fenders 4 arranged at the opposite sides of the rear cover member 20. Lower connecting frames 24 extend between the left rear wheel fender 4 and a left side surface of the transmission case 9, and between the right rear wheel fender 4 and a right side surface of the transmission case 9.

The upper connecting frame 23 includes an elongated portion 23A formed of a channel member and angled brackets 23B fixed to opposite ends of the elongated portion 23A. The angled brackets 23B are fixed to upper corners of the right and left rear wheel fenders 4 to allow the upper connecting frame 23 to extend between the right and left rear wheel fenders 4. Plate-like brackets 23a are formed to extend downward at right and left two positions of the elongated portion 23A. The upper cover member 20A of the rear cover member 20 is fixed to the plate-like brackets 23a through bolts 23b.

Each of the lower connecting frame 24 has an elongated portion 24A formed of an oblique channel member, a plate-like bracket 24B fixed to the elongated portion 24A adjacent to the rear fender, and a bent plate-like bracket 24C fixed to the elongated portion 24A adjacent to the transmission case.

The lower cover member 20B of the rear cover member 20 is fixed to the elongated portion 24A at right and left two positions through bolts 24b.

As shown in FIGS. 2 and 3, the intermediate cover member 20C and the lower cover member 20B include bulging portions 20e and 20f formed thereon, respectively, thereby to reinforce the plate-like rear cover member 20. The bulging portion 20f formed on the lower cover member 20B is allowed to contact the elongated portion 24A of the lower connecting frame 24 to be fixedly connected thereto through the bolts 24b.

Since the lower cover member is connected to the frame through the bolts 24b using the bulging portion 20f that is reinforced by the bulging shape in this way, a more rigid connecting structure is provided.

Figure 5:
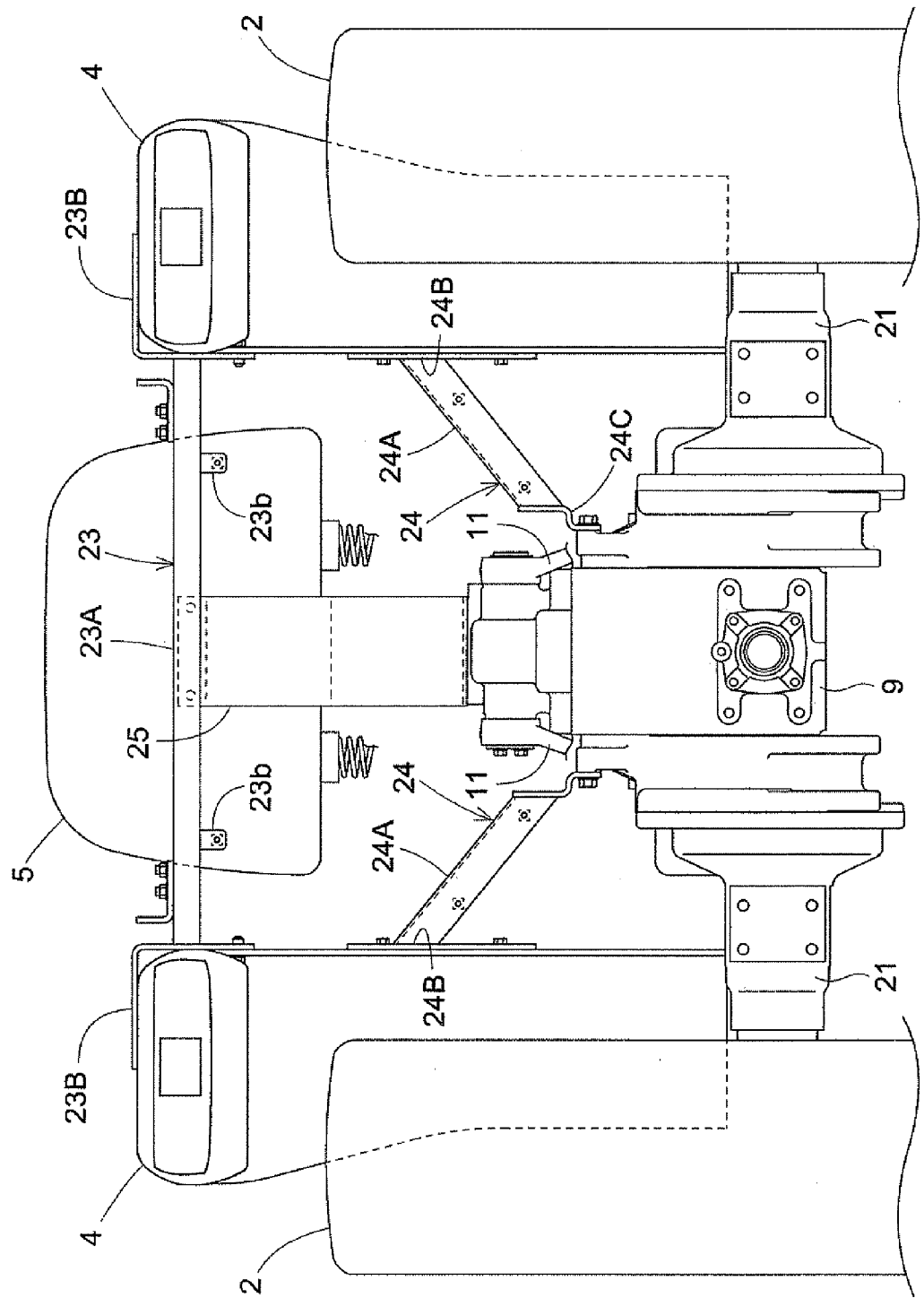
FIG. 5 is a rear view showing connecting frames for attaching the rear cover member.

As shown in FIGS. 3 and 5, a reinforcing plate 25 is provided forwardly of the rear cover member 20 for connecting the upper connecting frame 23 to the top surface of the transmission case thereby reinforcing the upper connecting frame 23. The reinforcing plate 25 extends between the lateral central portion of the upper connecting frame 23 and the top surface of the transmission case, and has a predetermined width and a bent shape extending substantially along the upper cover member 20A, the intermediate cover member 20C, and the lower cover member 20B.

The provision of the rear cover member 20 as noted above has the following advantages.

(1) It is prevented that mud and dust spattering from the rotary tiller or the like are scattered toward the driver's seat.

(2) The rear cover member can be removed in order to secure good visibility relative to the rotary tiller or the like, or in time of washing the machine.

Second Embodiment

Figure 10:
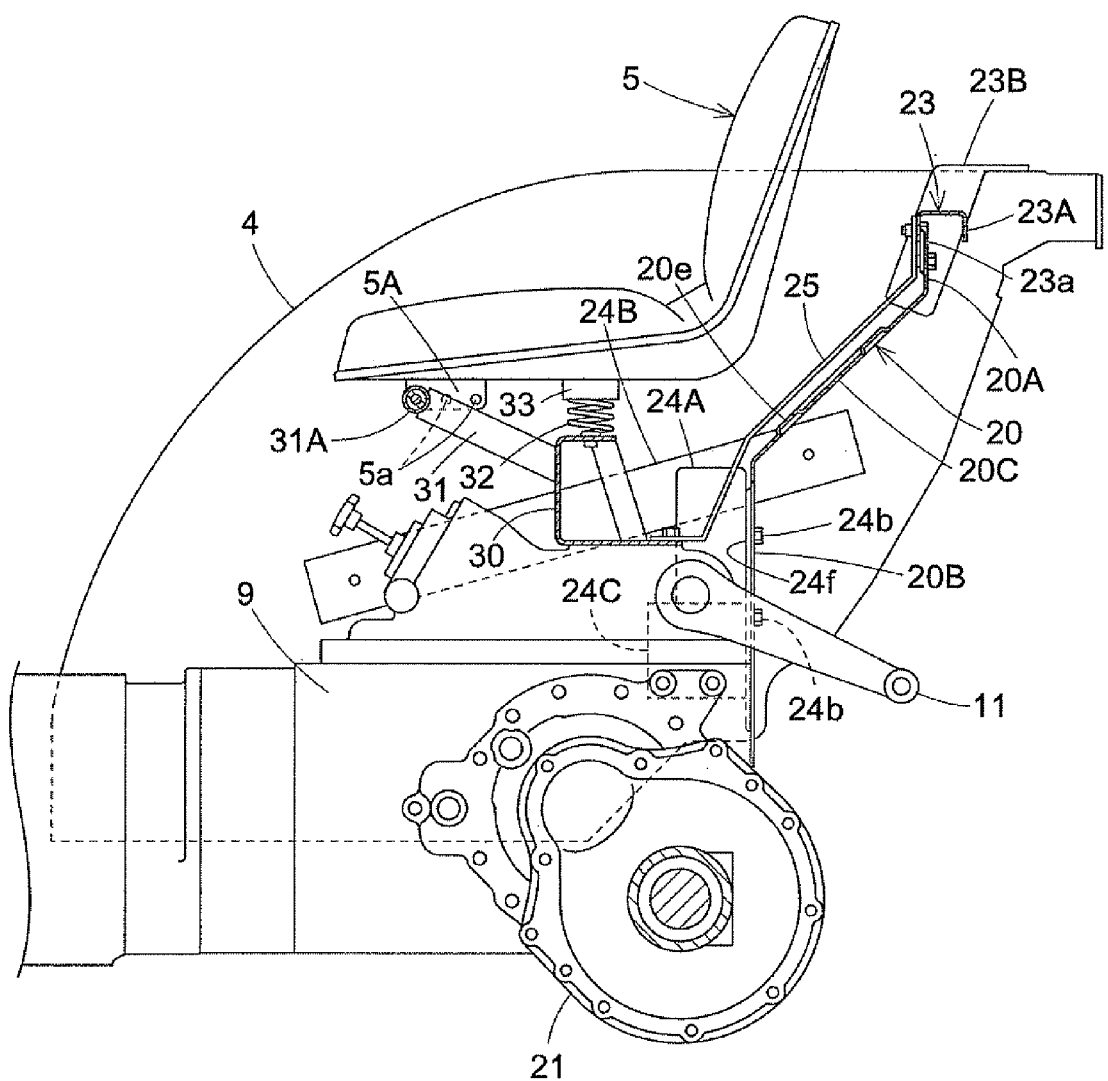
FIG. 10 is a side view representing another embodiment of the rear cover member and the driver's seat.

In this embodiment, the mode employing the driver's seat 5 that is not slidable in the fore and aft direction will be described. Only the arrangements different from the first embodiment will mainly be explained. As shown in FIG. 10, a channel-shaped horizontal frame 30 is mounted on the top surface of the transmission case 9, and support frames 31 extend upwardly and forwardly from the horizontal frame 30. The support frames 31 include a pair of right and left members. A boss portion 31A is fixed between the support frames 31.

A bracket 5A is attached to the bottom surface of the driver's seat 5. Three mounting bores 5a are formed in the bracket 5A for adjusting the attaching position for the support frames 31. On the other hand, an urging spring 32 is provided on the top surface of the horizontal frame 30 for resiliently supporting a rear end portion of the driver's seat 5, and includes a receiving member 33 attached to an upper end thereof.

As noted above, the supporting structure for the fixed-type driver's seat 5 is provided.

An attaching structure for the rear cover member 20 will be described next. Like the first embodiment, the rear cover member 20 includes the vertically extending upper cover member 20A, the vertically extending lower cover member 20B, and the obliquely extending intermediate cover member 20C.

The upper connecting frame 23 extends between the right and left rear wheel fenders 4 while the lower connecting frames 24 extend between the left rear wheel fender 4 and the left side surface of the transmission case 9, and between the right rear wheel fender 4 and the right side surface of the transmission case 9.

The plate-like brackets 23a are formed to extend downward at the right and left two positions of the upper connecting frame 23. The upper cover member 20A of the rear cover member 20 is fixed to the plate-like brackets 23a through the bolts. The first embodiment and the second embodiment are the same in the arrangement in which the lower cover member 20B of the rear cover member 20 is bolted to each of the lower connecting frames 24 at the two positions.

Such a bolted arrangement allows the rear cover member 20 to be removably attached to the upper connecting frame 23 and the lower connecting frames 24. It should be noted that the cutaway portions 20a and 20c employed in the first embodiment are not formed in the rear cover member 20 since the ROPS is not employed in the second embodiment.

Other Embodiments (1) Any implements other than the rotary tiller such as a plow may be employed as the ground work machine.

(2) The drain grooves 5a may be provided in the receiving surface portion 5F.

(3) The receiving surface portion 5F may have a flat surface instead of the convex surface.

(4) Coating may be applied at need to a rear surface of the rear cover member 20 that tends to receive mud to provide anti-abrasion properties and water-repellency.

(5) The rear cover member may not be removable.

(6) The lower cover member 20B of the rear cover member 20 may be positioned slightly forwardly of a proximal portion of the lift arms 11 relative to the vehicle (left side in FIG. 2).

What is claimed is:

1. A driver's seat of a work vehicle comprising:
   a seatback section; and
   a seating section including a receiving surface portion formed in an intermediate portion of the seating section for receiving buttocks of the operator, and a recessed groove formed along a side frame portion at a boundary between the side frame portion and the receiving surface portion to open at an extension distal end of the seating section,
   wherein the recessed groove has a bottom surface inclined downwardly from a back end of the recessed groove adjacent the seatback section to the extension distal end of the seating section, and the receiving surface portion has a convex surface having a downward inclined surface toward the recessed groove, the receiving surface portion having a downward inclination from the extension distal end of the seating section toward the seatback section.

2. The driver's seat as claimed in claim 1, wherein the side frame portion has an upper end higher than an upper end of the receiving surface portion.

3. The driver's seat as claimed in claim 1, wherein the recessed groove has a lateral width, the lateral width being increased as the recessed groove extends from the seatback section toward the extension distal end of the seating section.

4. The driver's seat as claimed in claim 1, wherein the recessed groove has a U-letter profile as seen from above, including a pair of right and left groove portions communicated with each other at the back end of the recessed groove.

5. The driver's seat as claimed in claim 1, wherein the receiving surface portion has a smooth outer surface substantially free from a groove portion.

* * * * *